United States Patent
Yen et al.

(10) Patent No.: US 8,619,061 B2
(45) Date of Patent: Dec. 31, 2013

(54) OPTICAL TOUCH APPARATUS AND OPERATING METHOD THEREOF

(75) Inventors: Meng Shin Yen, Taipei (TW); William Wang, Taoyuan (TW); Chung Cheng Chou, Taoyuan (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 529 days.

(21) Appl. No.: 12/721,265

(22) Filed: Mar. 10, 2010

(65) Prior Publication Data

US 2010/0265216 A1    Oct. 21, 2010

(30) Foreign Application Priority Data

Apr. 17, 2009  (TW) ................................ 98112845 A

(51) Int. Cl.
*G06F 3/042* (2006.01)

(52) U.S. Cl.
USPC ........ 345/175; 345/173; 345/178; 178/18.09; 178/18.11

(58) Field of Classification Search
USPC ..................... 345/173–178; 178/18.01–20.04
See application file for complete search history.

(56) References Cited

U.S. PATENT DOCUMENTS

| | | | | |
|---|---|---|---|---|
| 4,107,522 A | * | 8/1978 | Walter | 250/221 |
| 4,553,842 A | * | 11/1985 | Griffin | 356/621 |
| 4,743,769 A | * | 5/1988 | Schwaiger et al. | 250/559.19 |
| 4,788,441 A | * | 11/1988 | Laskowski | 250/559.38 |
| 5,805,288 A | * | 9/1998 | Simmons et al. | 356/614 |
| 6,130,663 A | * | 10/2000 | Null | 345/158 |
| RE42,794 E | * | 10/2011 | Fujioka | 382/291 |
| 2003/0001825 A1 | * | 1/2003 | Omura et al. | 345/173 |
| 2003/0234346 A1 | * | 12/2003 | Kao | 250/221 |
| 2004/0179001 A1 | * | 9/2004 | Morrison et al. | 345/179 |
| 2004/0201575 A1 | * | 10/2004 | Morrison | 345/173 |
| 2007/0052692 A1 | * | 3/2007 | Gruhlke et al. | 345/175 |
| 2009/0058833 A1 | * | 3/2009 | Newton | 345/175 |
| 2010/0110005 A1 | * | 5/2010 | Chtchetinine et al. | 345/158 |
| 2010/0141963 A1 | * | 6/2010 | Hsu et al. | 356/614 |

* cited by examiner

*Primary Examiner* — Gregory J Tryder

(57) ABSTRACT

An optical touch apparatus is disclosed. The optical touch apparatus comprises at least one light sensing module and a processing module. The at least one light sensing module is set at a first side of a surface of the optical touch apparatus, and used for receiving at least one light and generating a sensing result according to the condition of receiving the at least one light. The sensing result relates to whether the at least one light is blocked by at least one object above the surface and also relates to a comparing result between the at least one object and a reference region. The reference region is set at an opposite second side of the surface. The processing module determines at least one touch point position corresponding to the at least one object on the surface according to the sensing result.

18 Claims, 7 Drawing Sheets

OPTICAL TOUCH APPARATUS AND OPERATING METHOD THEREOF

BACKGROUND OF THE INVENTION

1. Field of the Invention

The present invention relates to a touch apparatus, and more particularly, to an optical touch apparatus and the method thereof capable of eliminating sensing blind angles effectively to make all regions sensible and the operation amount can be simplified to enhance the touch point sensing efficiency.

2. Description of the Prior Art

Recently, with the developing of image display related technology, there are various new types of display apparatus shown on the market to replace the conventional CRT monitor gradually. Wherein, the touch liquid crystal display has advantages such as power saving, smaller size, and inputting by touching directly, therefore, the touch liquid crystal display is popular to the ordinary consumers and becomes the main stream of the display market. The touch liquid crystal display is widely used in various types of electronic products, for example, an Automated Teller Machine (ATM), a point-of-sale (POS) terminal, a visitor navigation system, or an industrial controlling system.

In general, the current touch apparatus, such as a resistance touch apparatus, a capacitance touch apparatus, and an optical touch apparatus, can detect one touch point or more touch points through different detection theorems or ways. In the various types of touch apparatus mentioned above, because the optical touch apparatus has a characteristic of good transmittance; it has become another well-used technology different from the resistance touch apparatus and the capacitance touch apparatus. However, the conventional optical touch apparatus must comprise many light source emitters and light receivers set around the panel to detect touch points, therefore, additional space requirement of the entire panel apparatus is caused, so that the volume of the conventional optical touch apparatus can not be reduced, the manufacturing cost will be also huge, and the conventional optical touch apparatus also fails to achieve touch point detection with high resolution. Recently, the triangulation measurement method is applied to the optical touch technology to detect the touch points. In this way, the touch inputting resolution can be enhanced and the amount of the light emitters and the light receivers can be reduced, however, not only the problem of additional space requirement can not be solved, but also some new problems such as complicated calculations and the reflector of the border should be positioned precisely are occurred.

In addition, as shown in FIG. 1, the conventional optical touch apparatus 3 includes a panel 30, a light receiver 32, and a processing module 34. The light receiver 32 is set on the border of the panel 30, the sensible region of the panel 30 covered by the light receiver 32 can be obtained by extending the direction of view that the light receiver 32 receives the light signal. Obviously, the sensing range of the light receiver 32 fails to cover all regions of the panel 30, so that some sensing blind angles still existed.

Therefore, the invention provides an optical touch apparatus and operating method thereof to solve the aforementioned problems.

SUMMARY OF THE INVENTION

The invention provides an optical touch apparatus and the method thereof capable of eliminating sensing blind angles effectively to make all regions sensible and the operation can be simplified to enhance the touch point sensing efficiency.

A first embodiment of the invention is an optical touch apparatus. In this embodiment, the optical touch apparatus includes at least one light sensing module and a processing module. Wherein, the at least one light sensing module is set at a first side of a surface of the optical touch apparatus; a reference region is set at a second side opposite to the first side on the surface; the light sensing module is coupled to the processing module. A sensing range of the at least one light sensing module covers all regions of the surface.

The at least one light sensing module is used for receiving at least one light and generating a sensing result based on the condition of receiving the at least one light, wherein the sensing result relates to whether the at least one light is blocked by at least one object above the surface and also relates to a comparing result between the at least one object and a reference region. Then, the processing module determines at least one touch point position corresponding to the at least one object on the surface according to the sensing result.

A second embodiment of the invention is an optical touch apparatus operating method. In this embodiment, the optical touch apparatus includes at least one light sensing module and a processing module. Wherein, the at least one light sensing module is set at a first side of a surface of the optical touch apparatus; a reference region is set at a second side opposite to the first side on the surface. A sensing range of the at least one light sensing module covers all regions of the surface. The method includes steps of: (a) the at least one light sensing module receiving at least one light and generating a sensing result based on the condition of receiving the at least one light, wherein the sensing result relates to whether the at least one light is blocked by at least one object above the surface and also relates to a comparing result between the at least one object and a reference region, the reference region is set at a second side opposite to the first side on the surface; and (b) the processing module determining at least one touch point position corresponding to the at least one object on the surface according to the sensing result.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

Figure 3A:
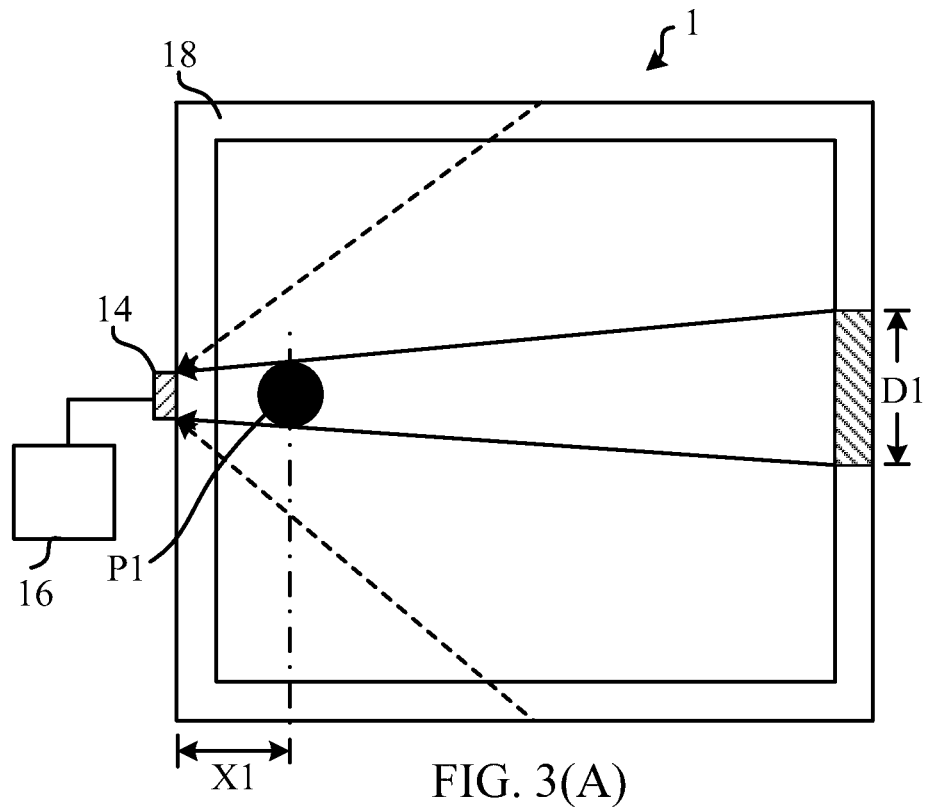
Figure 3B:
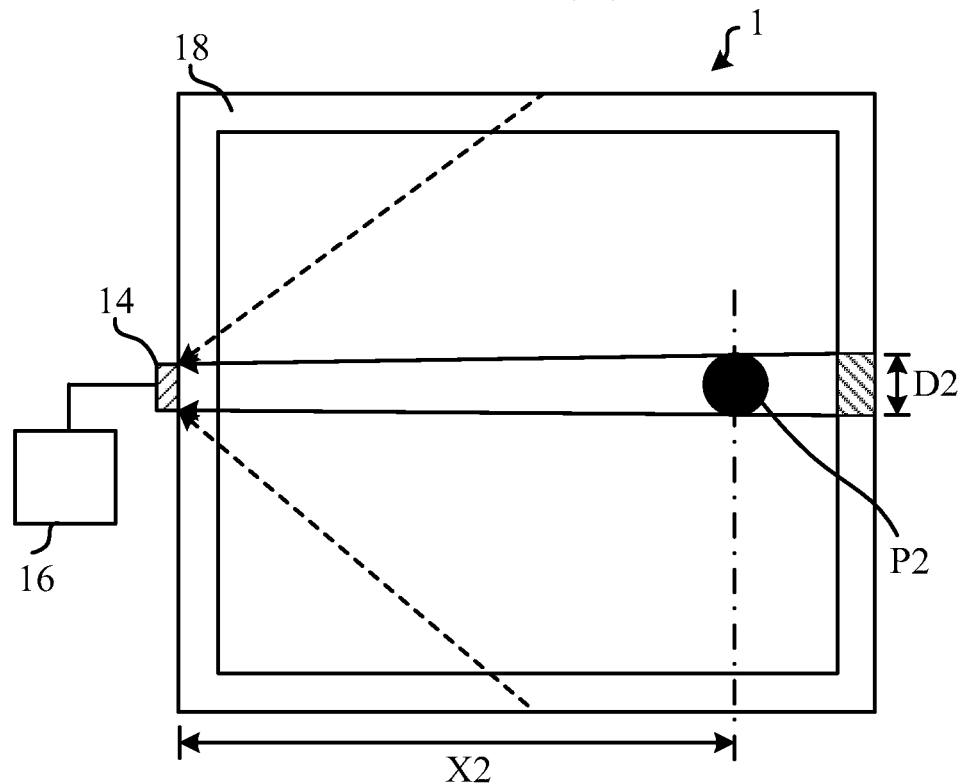

FIG. 3(A) and FIG. 3(B) illustrate scheme diagrams of the light sensing module determining the positions of different touch points in the sensible region.

Figure 4A:
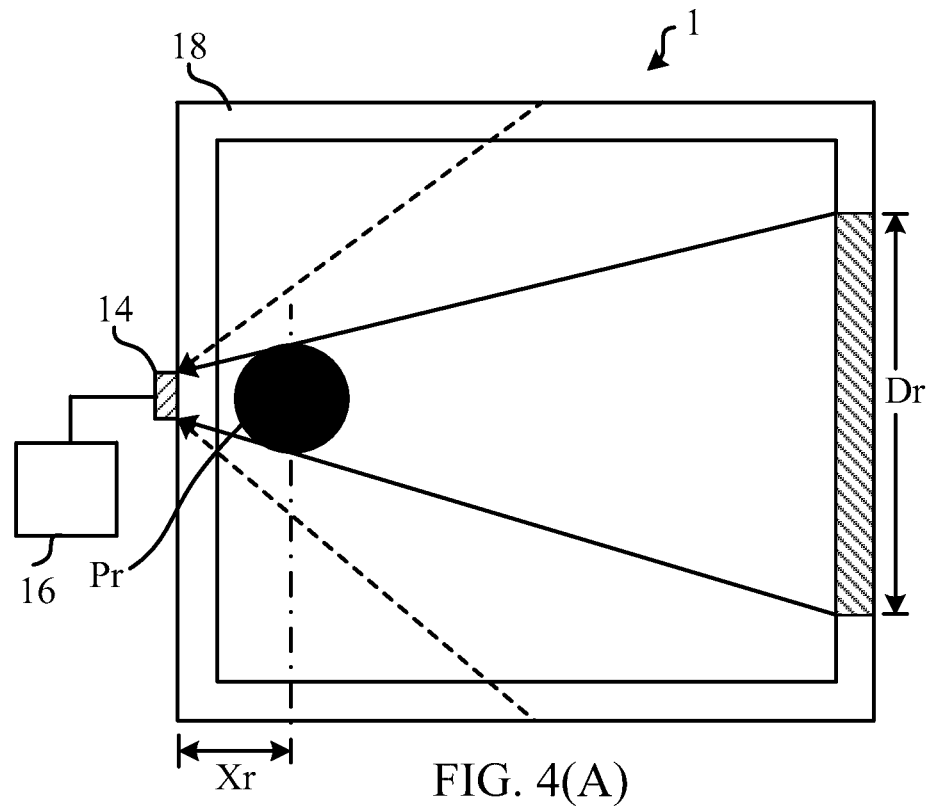
Figure 4B:
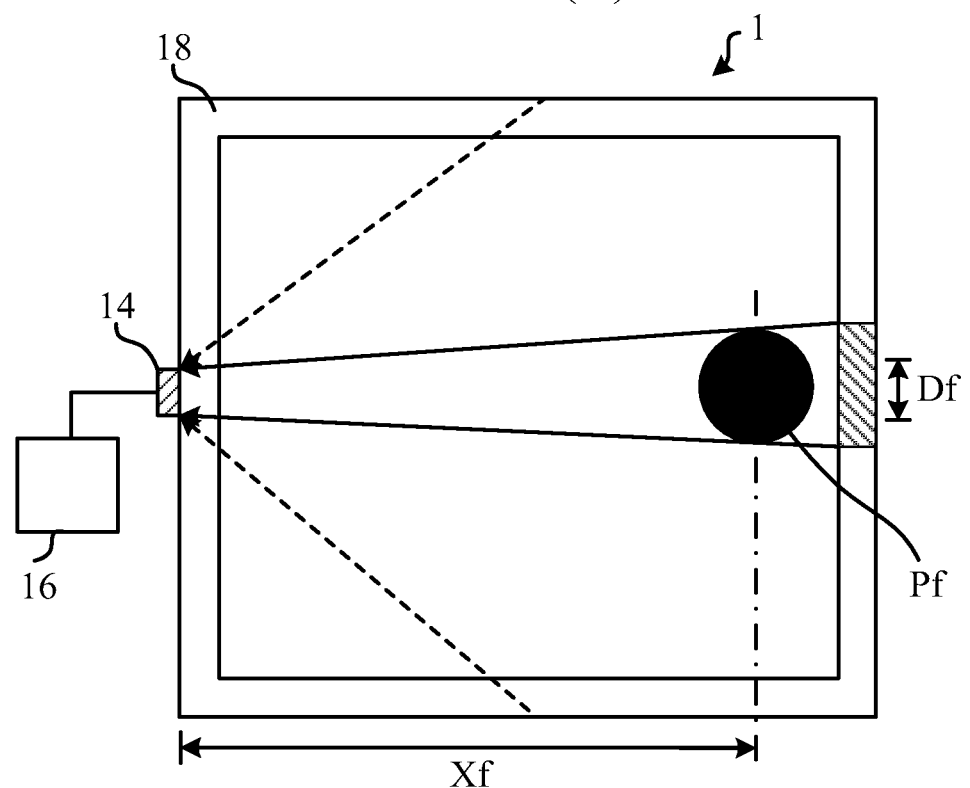

FIG. 4(A) and FIG. 4(B) illustrate scheme diagrams of the light sensing module determining the position of the moved another touch point based on the reference distance between the known reference touch point and the first side.

Figure 5:
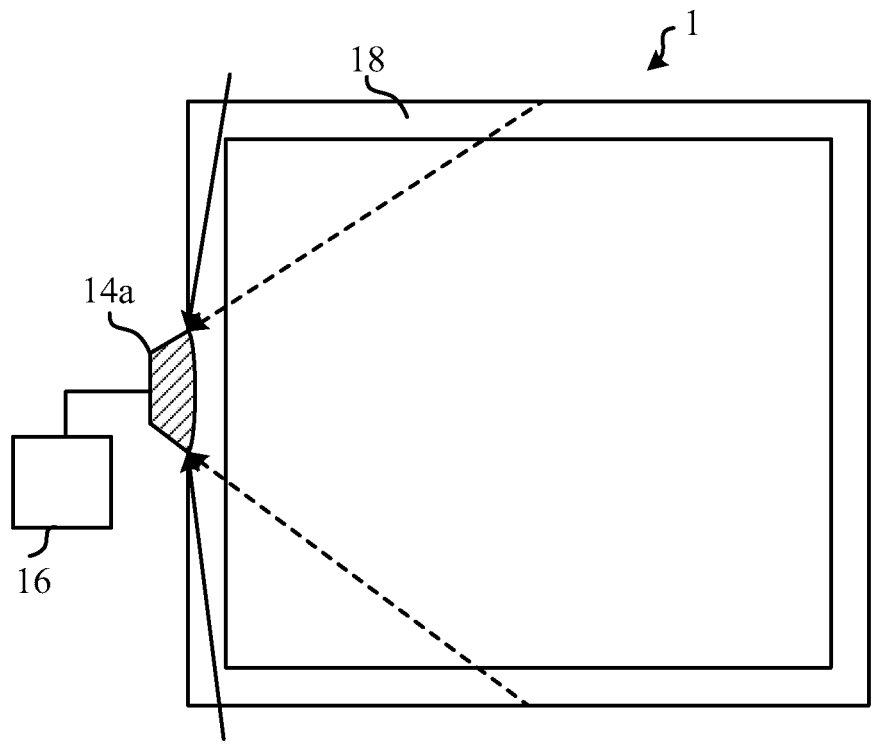

FIG. 5 illustrates a scheme diagram of the optical touch apparatus using the large-angle light receiver to sense all regions.

Figure 6A:
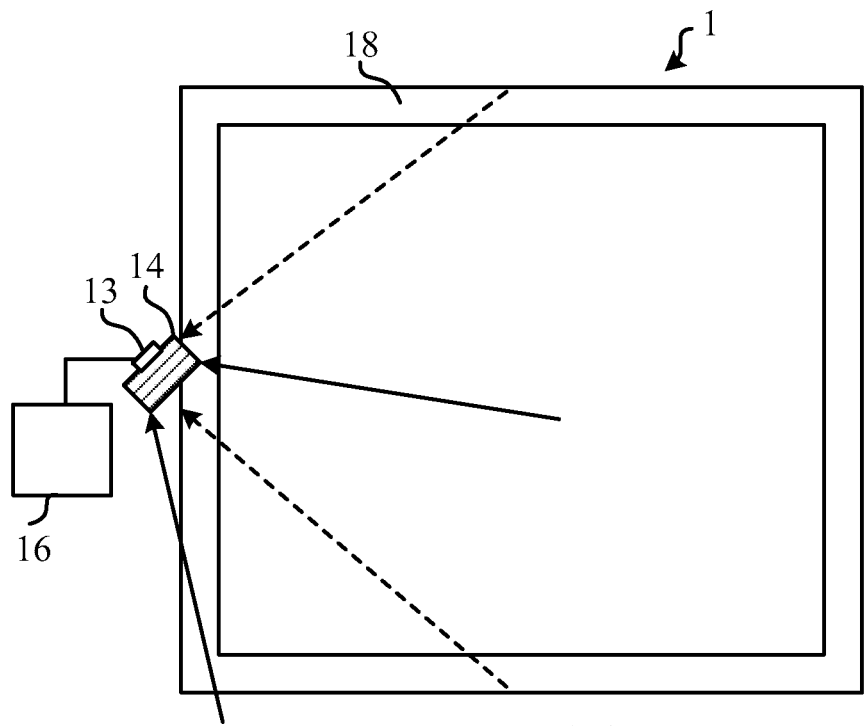
Figure 6B:
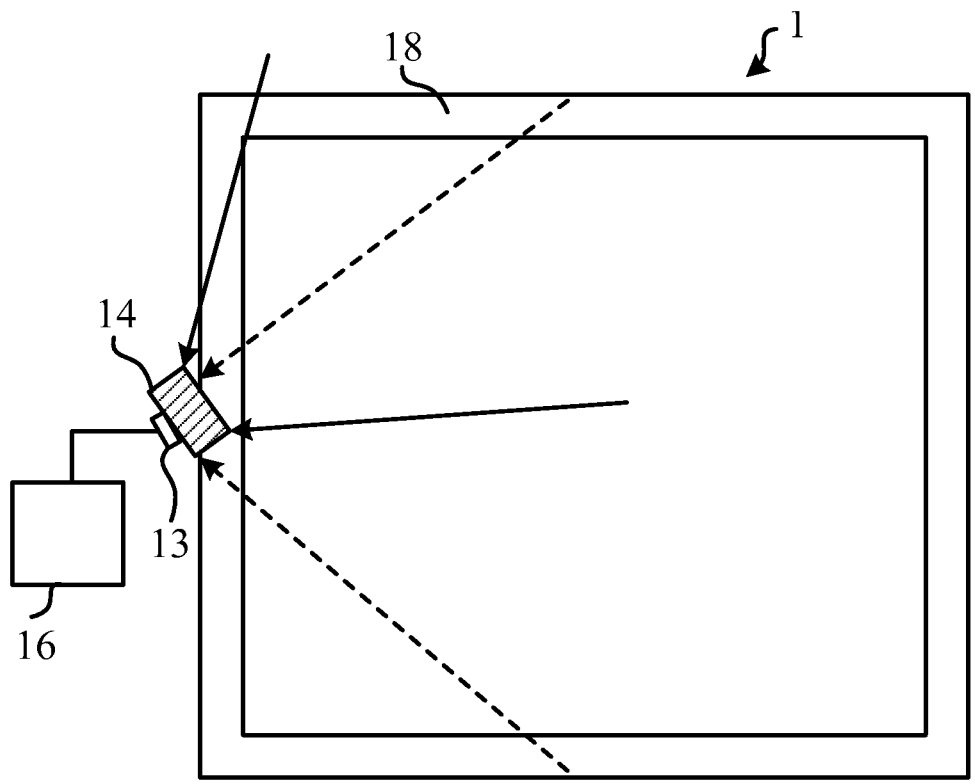

FIG. 6(A) and FIG. 6(B) illustrate scheme diagrams of the optical touch apparatus using the rotational light sensing module to sense all regions.

Figure 7:
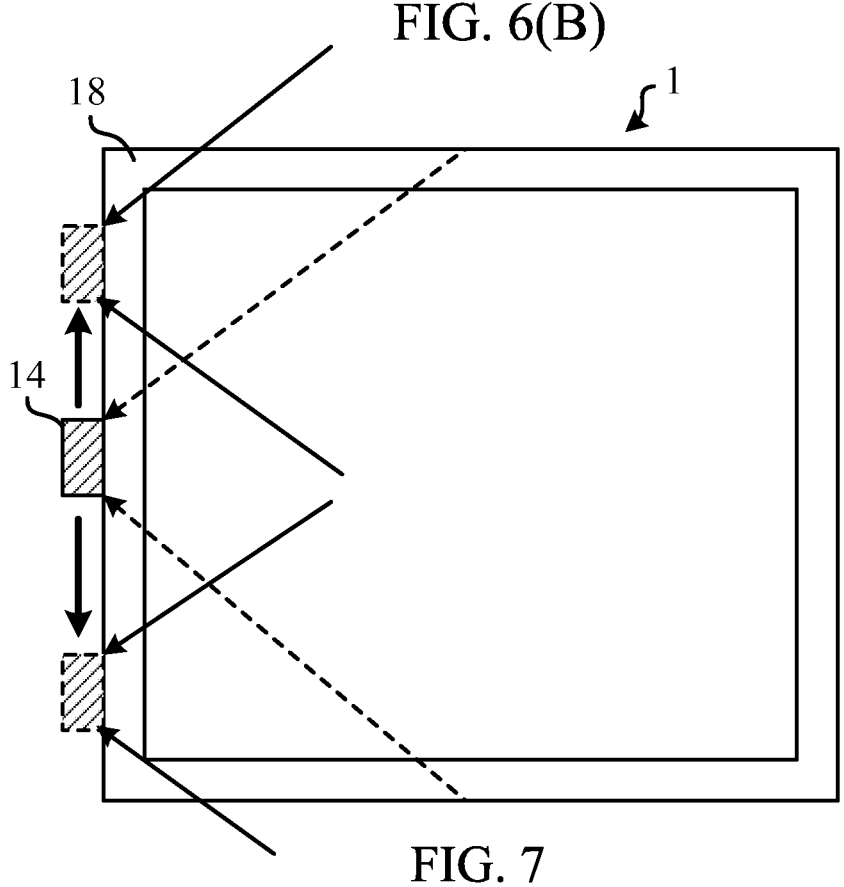

FIG. 7 illustrates a scheme diagram of the optical touch apparatus moving the light sensing module to sense all regions.

Figure 8A:
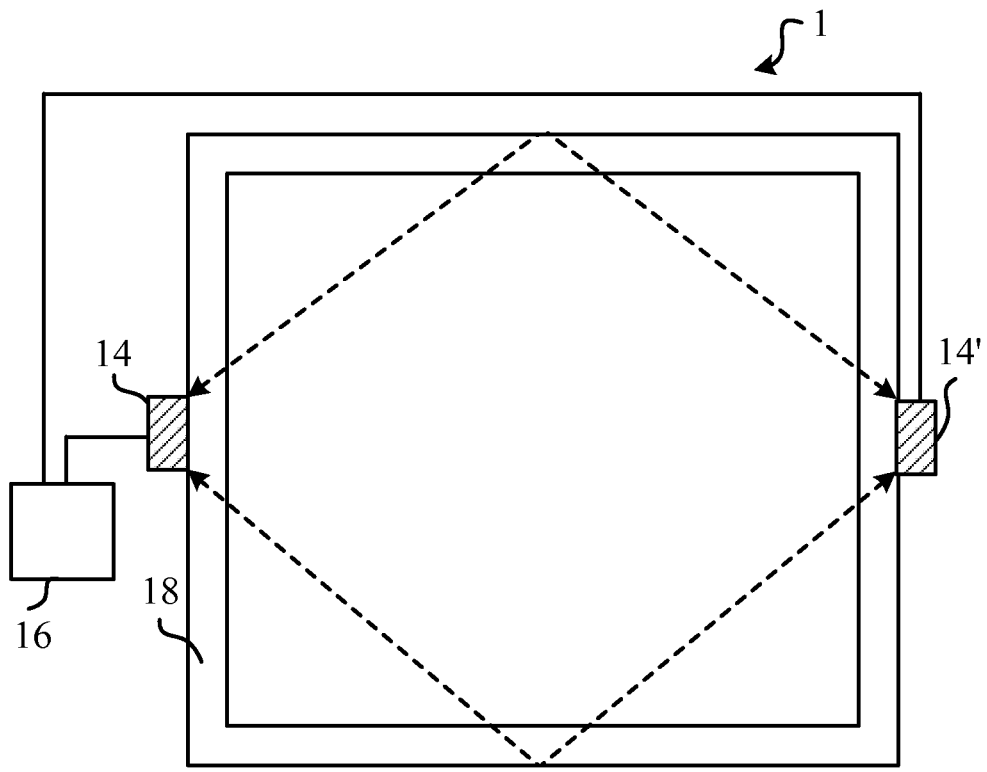

FIG. 8(A) illustrates a scheme diagram of the optical touch apparatus including another light sensing module set at the second side opposite to the first side to sense all regions.

Figure 8B:
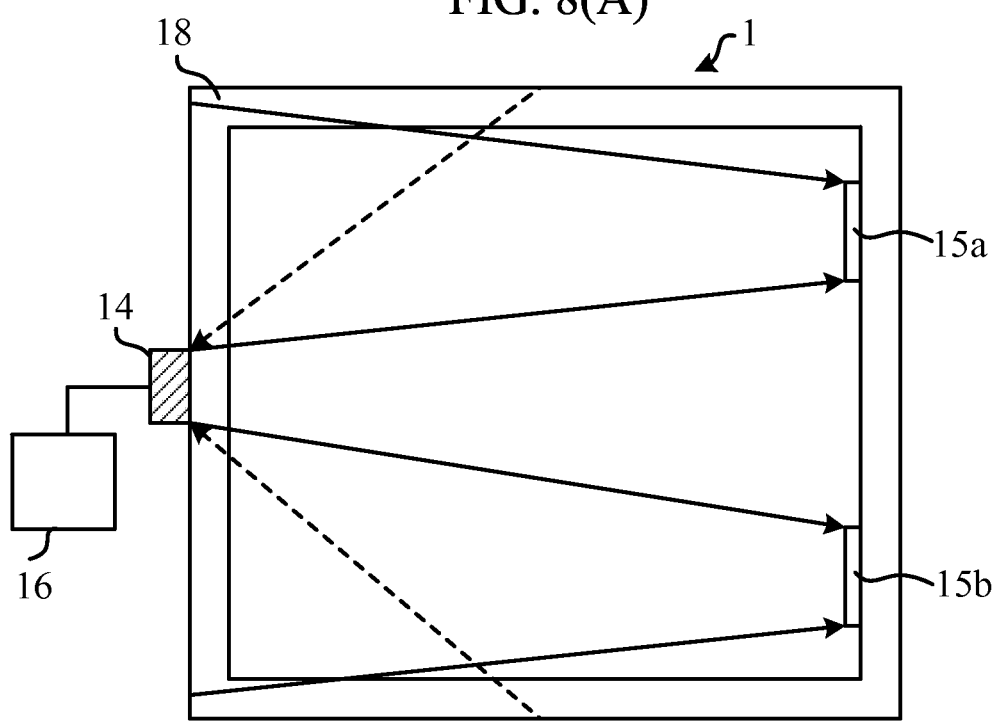

FIG. 8(B) illustrates a scheme diagram of the optical touch apparatus including two reflecting modules set at the second side opposite to the first side to sense all regions.

Figure 9:
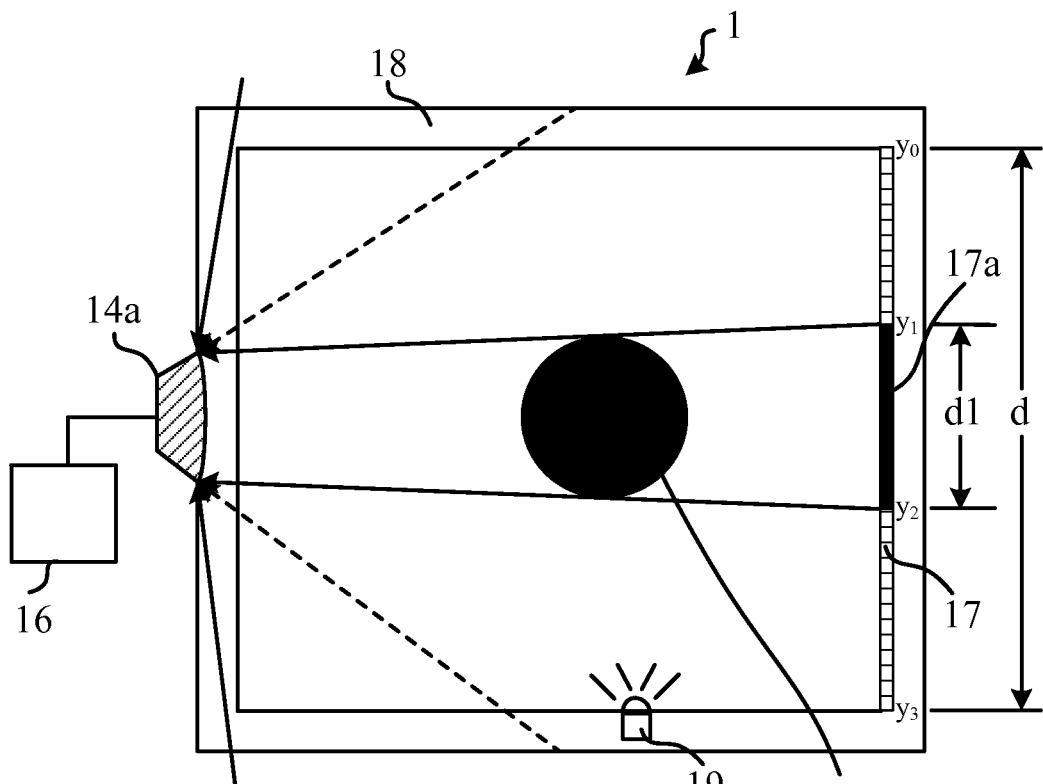

FIG. 9 illustrates a scheme diagram of the optical touch apparatus including a reference region set at the second side opposite to the first side.

Figure 10:
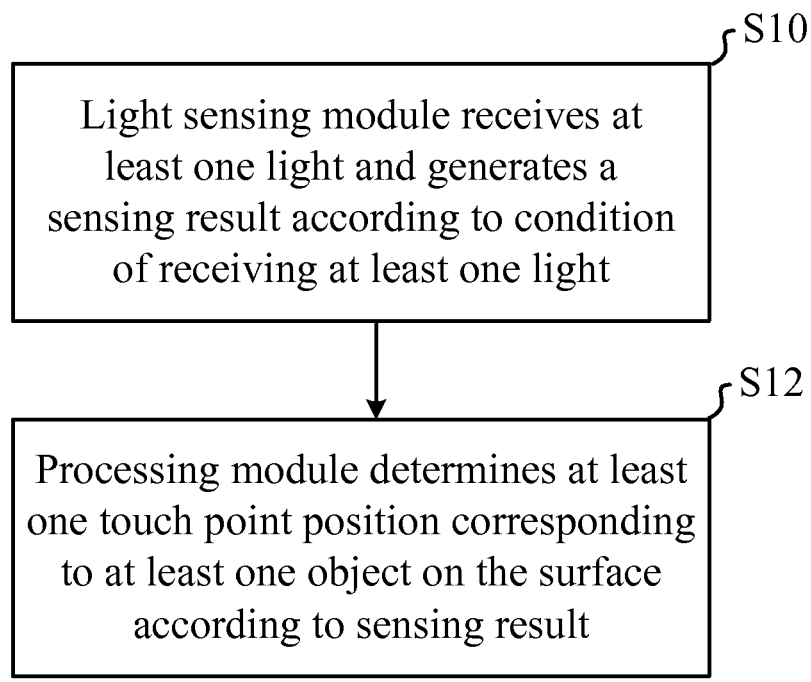

FIG. 10 illustrates a flowchart of the optical touch apparatus operating method in the second embodiment of the invention.

DETAILED DESCRIPTION OF THE INVENTION

Figure 2:
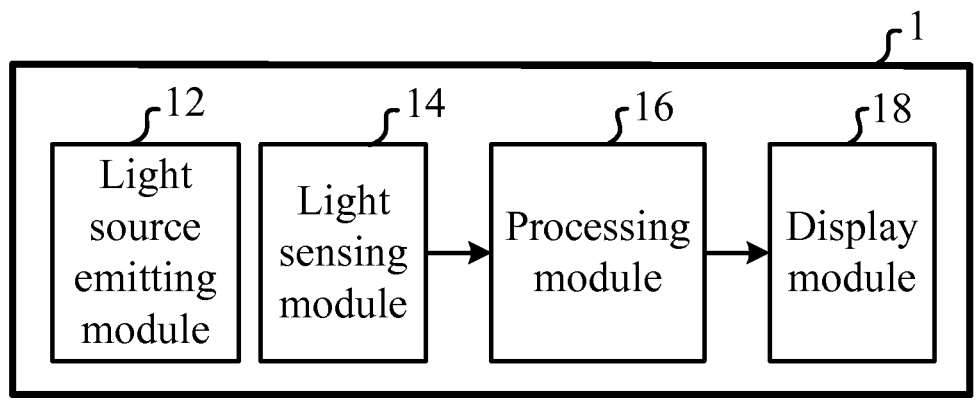
FIG. 2 illustrates a functional block diagram of the optical touch apparatus in the first embodiment of the invention.

A first embodiment of the invention is an optical touch apparatus. In this embodiment, the optical touch system can be applied to a LCD apparatus or other display apparatuses to provide the functions of displaying and touch inputting. Please refer to FIG. 2. FIG. 2 shows the functional block diagram of the optical touch apparatus.

As shown in FIG. 2, the optical touch apparatus 1 includes a light source emitting module 12, a light sensing module 14, a processing module 16, and a display module 18. Wherein, the light sensing module 14 is set at a first side of a surface of the display module 18, a reference region is set at a second side opposite to the first side on the surface; the light sensing module 14 is coupled to the processing module 16; the processing module 16 is coupled to the display module 18; the light source emitting module 12 can be set around the display module 18 ad used for emitting a plurality of lights simultaneously or sequentially, in fact, the plurality of lights can be also emitted from optical units with light guiding function of the light source emitting module 12 without any limitations.

It should be noticed that in this embodiment, the number of the light sensing module 14 can be one or more, and the sensing range of the light sensing module 14 can cover all regions of the surface. In addition, the light sensing module 14 can be any types of photoelectric sensors (e.g., the Charge Coupled Device (CCD) sensor, the Complementary Metal-Oxide-Semiconductor (CMOS) sensor, the light-pressure sensor, the light-light sensor, the light-heat sensor, the light-sound sensor, or the light-magnetic sensor, once the light sensing module 14 can receive a light signal and convert the light signal into the signal form that can be processed by the processing module 16, the light sensing module 14 will be suitable for the optical touch apparatus 1 of the invention.

At first, how the light sensing module 14 to determine the positions of the touch points in the sensible region will be described. Please refer to FIG. 3(A) and FIG. 3(B). FIG. 3(A) and FIG. 3(B) illustrate scheme diagrams of the light sensing module 14 determining the positions of different touch points P1 and P2 in the sensible region. As shown in FIG. 3(A) and FIG. 3(B), if the distances between the positions of the object forming touch points P1, P2 and the first side are X1 and X2 respectively, and the sizes of the dark regions formed on the second side opposite to the first side when the object blocks the lights emitting to the light sensing module 14 are D1 and D2 respectively, the processing module 16 can obtain X1 and X2 based on the above-mentioned information provided by the light sensing module 14 to get the coordinates of the touch points P1 and P2.

In addition, since the sizes of the objects forming touch points can be different, the sizes of the touch points formed by the objects can be also different, so that the condition of touch point wrong determination may be occurred. Therefore, as shown in FIG. 4(A), the object can be set at a reference point to form a reference touch point Pr, a reference distance Xr between the reference touch point Pr and the first side is known, and the size of the dark region formed at the second side opposite to the first side when the object blocks the light emitting to the light sensing module 14 is Dr. As shown in FIG. 4(B), when the object is then moved to the position of the touch point Pf, the size of the dark region formed at the second side when the object blocks the light emitting to the light sensing module 14 is Df, at this time, the processing module 16 can obtain the distance Xf between the moved touch point Pf and the first side based on Dr, Df, and the known reference distance Xr to get the coordinate of the moved touch point Pf.

Figure 1:
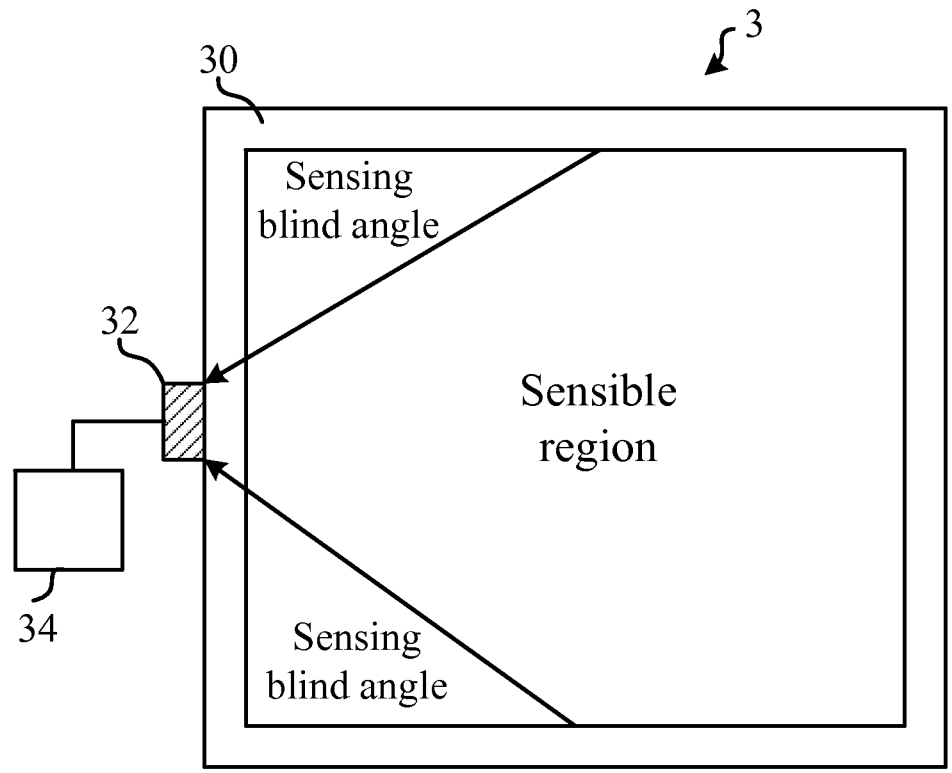
FIG. 1 illustrates a scheme diagram of the conventional optical touch apparatus including a light receiver having sensing blind angles.

In practical applications, in order to prevent the sensing blind angles existed in the sensing range of the light receiver 32 of the conventional optical touch apparatus 3 shown in FIG. 1, the following methods are provided by the invention to make the sensing range of the light sensing module 14 of the optical touch apparatus 1 to cover all regions of the surface, namely the effect of sensing all regions can be achieved.

At first, please refer to FIG. 5. FIG. 5 illustrates a scheme diagram of the optical touch apparatus 1 using the large-angle light receiver 14a to sense all regions. As shown in FIG. 5, since the light receiving angle of the large-angle light receiver 14a is larger than that of the ordinary light receiver, the optical touch apparatus 1 can increase its sensing range, so that all regions of the surface are all sensible regions without any sensing blind angles.

Next, please refer to FIG. 6(A) and FIG. 6(B). FIG. 6(A) and FIG. 6(B) illustrate scheme diagrams of the optical touch apparatus 1 using the rotational light sensing module 14 to sense all regions. As shown in FIG. 6(A) and FIG. 6(B), the rotational light sensing module 14 can be set on a rotating base 13, and the sensing range of the light sensing module 14 can cover all regions of the surface without any sensing blind angles by rotating the rotating base 13 upward and downward.

Then, please refer to FIG. 7. FIG. 7 illustrates a scheme diagram of the optical touch apparatus 1 moving the light sensing module 14 to sense all regions. As shown in FIG. 7, the sensing range of the light sensing module 14 can cover all regions of the surface without any sensing blind angles when the light sensing module 14 is moved upward and downward on the first side.

Except the above-mentioned methods, the optical touch apparatus 1 can eliminate the sensing blind angles by suitably arranging several optical units. As shown in FIG. 8(A), not only the light sensing module 14 originally set at the first side of the optical touch apparatus 1, but also another light sensing module 14' can be further set at the second side opposite to the first side to sense all regions. It should be noticed that there is no limitation to the number and the position of the light sensing module 14', so that the light sensing module 14' can be set at the position shown in FIG. 8(A) and set at the upper frame and lower frame of the display module 18. In addition, as shown in FIG. 8(B), the reflecting modules 15a and 15b can be set at the second side opposite to the first side on the optical touch apparatus 1 to reflect lights to eliminate the sensing blind angles originally formed, so that its sensing range can be enlarged to cover all regions of the surface.

After the optical touch apparatus 1 achieves the effect of sensing all regions through the above-mentioned methods, in order to effectively reduce the huge information operation amount when the processing module 16 originally senses the touch points to enhance the touch point sensing efficiency, as shown in FIG. 9, the optical touch apparatus 1 uses the large-angle light receiver 14a to sense all regions, and the reference region 17 is set at the second side opposite to the large-angle light receiver 14a. In this embodiment, the reference region 17 includes at least one reference pattern, the at least one reference pattern is shown in a light-and-dark interlacing way (e.g., transparent or not, light reflecting or not) to provide the effect of a positioning optical ruler, and the at least one reference pattern is used to be compared with the at least one object to generate the comparing result.

In fact, the comparing result relates to the proportion of the length d1 of the dark region 17a formed when the object blocks the light emitted to the reference region 17 to the length d of the reference region 17, such as d1:d=1:3. Furthermore, the corresponding relationships between the positions y1, y2 of two ends of the dark region 17a and the positions y0, y3 of two ends of the reference region 17 (e.g., if y0=0 and y3=20, then y1=7 and y2=13) can be used as a reference basis when the processing module 16 determines the position of touch point. In this embodiment, the reference pattern of the reference region 17 can be barcode, optical ruler, grating, or other similar types of pattern to provide the effect of the positioning optical ruler to reduce the huge amount of operation originally processed by the processing module 16 to determine the touch points. It should be noticed that all the design of the above-mentioned reference region 17 needs is to provide a specific patterned region that can be determined; there is no limitation about the conditions of the pattern, such as the symmetrization, color, and type of the pattern.

In addition, considering the optical touch apparatus 1 can be used in a weak light environment, such as the occasion of a meeting using the projected slides, an auxiliary light source emitting module 19 can be set around the display module 18, for emitting an auxiliary light source for the large-angle light receiver 14a to be normally operated under a weak light environment. In practical applications, there is no limitation to the types of the auxiliary light source emitted from the auxiliary light source emitting module 19; it can be a LED, a fluorescent light or a cold light.

A second embodiment of the invention is an optical touch apparatus operating method. In this embodiment, the optical touch apparatus includes at least one light sensing module and a processing module. Wherein, the at least one light sensing module is coupled to the processing module, and the at least one light sensing module is set at a first side of a surface of the optical touch apparatus. It should be noticed that a reference region is set at a second side opposite to the first side on the surface; a sensing range of the at least one light sensing module can cover all regions of the surface.

Please refer to FIG. 10. FIG. 10 shows the flowchart of the optical touch apparatus operating method. As shown in FIG. 10, in step S10, the at least one light sensing module receives at least one light and generates a sensing result based on the condition of receiving the at least one light, wherein the sensing result relates to whether the at least one light is blocked by at least one object above the surface and also relates to a comparing result between the at least one object and a reference region. Then, in step S12, the processing module determines at least one touch point position corresponding to the at least one object on the surface according to the sensing result.

In practical applications, in order to help the sensing range of the light sensing module of the optical touch apparatus to cover all regions of the surface, the invention provides several ways, such as the large-angle light receiver, the rotational light sensing module, moving the light sensing module, and suitably setting several optical units to eliminate the sensing blind angles formed originally, so that the effect of sensing all regions can be achieved.

Moreover, the reference region is set at the second side opposite to the first side on the surface to effectively reduce the huge information operation amount when the processing module determines the touch points originally to enhance the efficiency of sensing the touch points. In fact, the reference region can include at least one reference pattern, the at least one reference pattern is shown in a light-and-dark interlacing way (e.g., transparent or not, light reflecting or not) to provide the effect of a positioning optical ruler, and the at least one reference pattern is used to be compared with the at least one object to generate the comparing result. The reference pattern of the reference region can be barcode, optical ruler, grating, or other similar types of pattern to provide the effect of the positioning optical ruler to reduce the huge amount of operation originally processed by the processing module to determine the touch points.

Compared to prior arts, the optical touch apparatus and operating method thereof not only eliminates the sensing blind angles to achieve the effect of sensing all regions through setting the large-angle light receiver, the rotational light sensing module, moving the light sensing module, and suitably setting several optical units, but also largely simplifies the operation amount to enhance the touch point sensing efficiency through setting the reference region to provide the effect of the positioning optical ruler to compare with the object forming the touch points. The object forming the touch points can even keep a distance away from the surface of the panel, so that the effect of detecting 3-D touch points can be achieved.

Although the present invention has been illustrated and described with reference to the preferred embodiment thereof, it should be understood that it is in no way limited to the details of such embodiment but is capable of numerous modifications within the scope of the appended claims.

What is claimed is:

1. An optical touch apparatus, comprising:
  a light source emitting module, for emitting at least one light simultaneously or sequentially;
  at least one light sensing module, set at a first side of a surface of the optical touch apparatus, for receiving the at least one light and generating a sensing result based on the condition of receiving the at least one light, wherein the sensing result relates to whether the at least one light is blocked by at least one object above the surface and also relates to a comparing result between the at least one object and a reference region, the reference region is set at a second side opposite to the first side on the surface; and
  a processing module, coupled to the at least one light sensing module, for determining at least one touch point position corresponding to the at least one object on the surface according to the sensing result;
  wherein the at least one object is set at a reference point to form a reference touch point, a reference distance between the reference touch point and the first side is known, and a first dark region formed at the second side when the at least one object blocks the at least one light emitted to the at least one light sensing module has a first size, when the at least one object is moved to a specific touch point position, a second dark region formed at the second side when the at least one object blocks the at least one light emitted to the at least one light sensing module has a second size, the processing module obtains a specific distance between the specific touch point position and the first side based on the first size and the second size, and obtains a coordinate of the specific touch point position based on the reference distance and the specific distance, a plurality of reflecting modules is further set at the second side of the surface to eliminate possible sensing blind angles in a reflecting way, and the position of a gap between two of the plurality of reflecting modules corresponds to the position of the at least one light sensing module.

2. The optical touch apparatus of claim 1, wherein a sensing range of the at least one light sensing module covers all regions of the surface.

3. The optical touch apparatus of claim 2, wherein the at least light sensing module comprises a large-angle light receiver used for eliminating possible sensing blind angles, so that the sensing range of the at least one light sensing module can be enlarged to cover all regions of the surface.

4. The optical touch apparatus of claim 2, wherein the at least one light sensing module eliminates possible sensing blind angles in an angle rotating way, so that the sensing range of the at least one light sensing module can cover all regions of the surface.

5. The optical touch apparatus of claim 2, wherein the at least one light sensing module eliminates possible sensing blind angles by moving along the first side, so that the sensing range of the at least one light sensing module can cover all regions of the surface.

6. The optical touch apparatus of claim 2, wherein another light sensing module is further set at the second side of the surface to eliminate possible sensing blind angles, so that the sensing range of the at least one light sensing module can cover all regions of the surface.

7. The optical touch apparatus of claim 1, further comprising:
an auxiliary light source emitting module, set around the surface, for emitting an auxiliary light source for the at least one light sensing module to be normally operated under a weak light environment.

8. The optical touch apparatus of claim 1, wherein the reference region comprises at least one reference pattern, the at least one reference pattern is used to be compared with the at least one object to generate the comparing result, the comparing result relates to the proportion of a dark region formed when the at least one object blocks the at least one light to the reference region.

9. The optical touch apparatus of claim 8, wherein the at least one reference pattern is shown in a light-and-dark interlacing way to provide the effect of a positioning optical ruler.

10. A method of operating an optical touch apparatus, at least one light sensing module being set at a first side of a surface of the optical touch apparatus, a reference region being set at a second side opposite to the first side on the surface, the method comprising the steps of:
emitting at least one light simultaneously or sequentially;
receiving the at least one light and generating a sensing result based on the condition of receiving the at least one light, wherein the sensing result relates to whether the at least one light is blocked by at least one object above the surface and also relates to a comparing result between the at least one object and a reference region, the reference region is set at a second side opposite to the first side on the surface; and
determining at least one touch point position corresponding to the at least one object on the surface according to the sensing result;
wherein the at least one object is set at a reference point to form a reference touch point, a reference distance between the reference touch point and the first side is known, and a first dark region formed at the second side when the at least one object blocks the at least one light emitted to the at least one light sensing module has a first size, when the at least one object is moved to a specific touch point position, a second dark region formed at the second side when the at least one object blocks the at least one light emitted to the at least one light sensing module has a second size, the optical touch apparatus obtains a specific distance between the specific touch point position and the first side based on the first size and the second size, and obtains a coordinate of the specific touch point position based on the reference distance and the specific distance, a plurality of reflecting modules is further set at the second side of the surface to eliminate possible sensing blind angles in a reflecting way, and the position of a gap between two of the plurality of reflecting modules corresponds to the position of the at least one light sensing module.

11. The method of claim 10, wherein a sensing range of the at least one light sensing module covers all regions of the surface.

12. The method of claim 11, wherein a large-angle light receiver of the at least light sensing module is used for eliminating possible sensing blind angles, so that the sensing range of the at least one light sensing module can be enlarged to cover all regions of the surface.

13. The method of claim 11, wherein the at least one light sensing module eliminates possible sensing blind angles in an angle rotating way, so that the sensing range of the at least one light sensing module can cover all regions of the surface.

14. The method of claim 11, wherein the at least one light sensing module eliminates possible sensing blind angles by moving along the first side, so that the sensing range of the at least one light sensing module can cover all regions of the surface.

15. The method of claim 11, wherein another light sensing module is further set at the second side of the surface to eliminate possible sensing blind angles, so that the sensing range of the at least one light sensing module can cover all regions of the surface.

16. The method of claim 10, wherein an auxiliary light source emitting module is set around the surface and used for emitting an auxiliary light source for the at least one light sensing module to be normally operated under a weak light environment.

17. The method of claim 10, wherein at least one reference pattern of the reference region is used to be compared with the at least one object to generate the comparing result, the comparing result relates to the proportion of a dark region formed when the at least one object blocks the at least one light to the reference region.

18. The method of claim 17, wherein the at least one reference pattern is shown in a light-and-dark interlacing way to provide the effect of a positioning optical ruler.

* * * * *